(12) United States Patent
Ederer et al.

(10) Patent No.: US 9,463,488 B2
(45) Date of Patent: Oct. 11, 2016

(54) METHOD FOR APPLYING PARTICLE MATERIAL INCLUDING A METERING SYSTEM AND LEVELING ELEMENT

(75) Inventors: Ingo Ederer, Geltendorf (DE); Kaveh Kashani-Shirazi, München (DE)

(73) Assignee: VOXELJET AG, Friedberg (DE)

( * ) Notice: Subject to any disclaimer, the term of this patent is extended or adjusted under 35 U.S.C. 154(b) by 398 days.

(21) Appl. No.: 13/327,856

(22) Filed: Dec. 16, 2011

(65) Prior Publication Data

US 2012/0094026 A1    Apr. 19, 2012

Related U.S. Application Data

(62) Division of application No. 10/597,982, filed as application No. PCT/DE2005/000237 on Feb. 11, 2005, now Pat. No. 8,096,262.

(51) Int. Cl.
| | | |
|---|---|---|
| *B05D 3/12* | (2006.01) | |
| *B05D 1/26* | (2006.01) | |
| *B05C 19/04* | (2006.01) | |
| *B05C 19/06* | (2006.01) | |
| *B22F 3/00* | (2006.01) | |
| *B29C 41/12* | (2006.01) | |
| *B29C 41/52* | (2006.01) | |
| *B29C 67/00* | (2006.01) | |

(52) U.S. Cl.
CPC ............... *B05D 1/26* (2013.01); *B05C 19/04* (2013.01); *B05C 19/06* (2013.01); *B22F 3/004* (2013.01); *B22F 3/008* (2013.01); *B29C 41/12* (2013.01); *B29C 67/0077* (2013.01); *B29C 41/52* (2013.01); *B29C 67/0051* (2013.01)

(58) Field of Classification Search
CPC ............................... B29C 47/122; B05D 1/24
USPC ............ 427/355, 421.1, 212, 189, 356, 359; 220/568, 661, 665, 676
See application file for complete search history.

(56) References Cited

U.S. PATENT DOCUMENTS

| | | | |
|---|---|---|---|
| 2,640,629 | A | 6/1953 | McDonald |
| 2,692,142 | A | 10/1954 | Hunter |

(Continued)

FOREIGN PATENT DOCUMENTS

| | | |
|---|---|---|
| DE | 4300478 C1 | 8/1994 |
| DE | 4325573 | 2/1995 |

(Continued)

OTHER PUBLICATIONS

US 4,937,420, 06/1990, Deckard (withdrawn)

(Continued)

*Primary Examiner* — Francisco Tschen
(74) *Attorney, Agent, or Firm* — The Dobrusin Law Firm, P.C.

(57) ABSTRACT

This document describes a process and a device for applying fluids, specifically particle material, on an area to be coated, which is viewed in forward moving direction of the coater, chat fluid is applied on the area to be coated and then a levelling element is run over the applied fluid, whereby the fluid is led from a metering system provided with an opening, which oscillates when applying the fluid. The opening shall be designed in such a way that when the metering system is at a standstill this is closed by forming an angle of repose of the fluid.

21 Claims, 2 Drawing Sheets

(56) References Cited

U.S. PATENT DOCUMENTS

Figure 1:
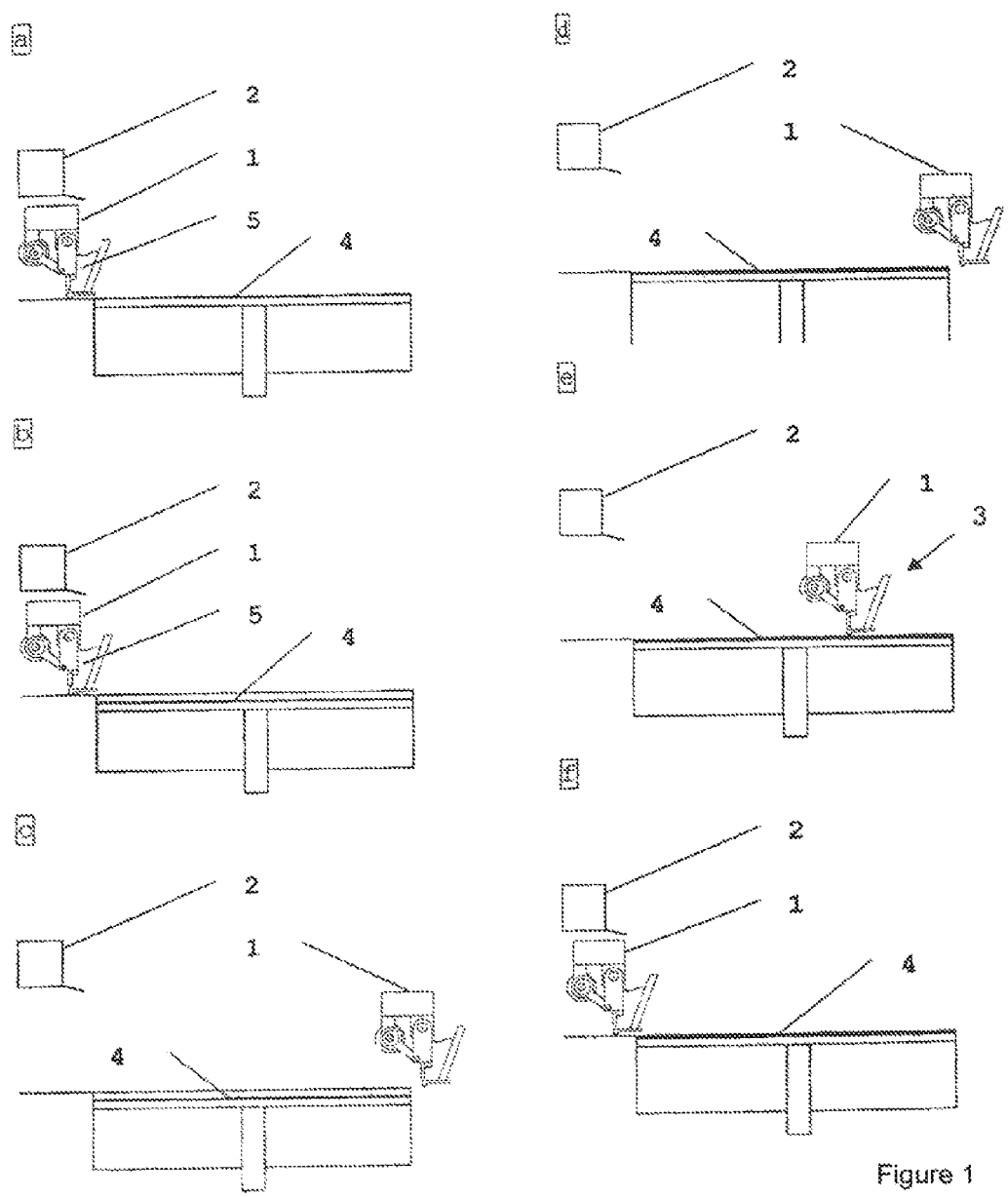

| | | |
|---|---|---|
| 2,857,938 A | 10/1958 | Wahl |
| 3,197,324 A * | 7/1965 | Brooks .................. B05D 1/24 |
| | | 118/405 |
| 3,616,969 A | 11/1971 | Koizumi |
| 3,616,972 A | 11/1971 | Christy |
| 3,815,527 A | 6/1974 | Dobbins |
| 3,913,503 A | 10/1975 | Becker |
| 4,239,715 A | 12/1980 | Pratt |
| 4,247,508 A | 1/1981 | Housholder |
| 4,279,949 A | 7/1981 | Esser |
| 4,369,025 A | 1/1983 | Von Der Weid |
| 4,532,882 A | 8/1985 | Ciraud |
| 4,575,330 A | 3/1986 | Hull |
| 4,579,252 A | 4/1986 | Wilson |
| 4,610,218 A | 9/1986 | Johnson et al. |
| 4,630,755 A | 12/1986 | Campbell |
| 4,669,634 A | 6/1987 | Leroux |
| 4,752,352 A | 6/1988 | Feygin |
| 4,863,538 A | 9/1989 | Deckard |
| 4,889,433 A | 12/1989 | Pratt |
| 4,938,816 A | 7/1990 | Beaman et al. |
| 4,944,817 A | 7/1990 | Bourell et al. |
| 5,017,753 A | 5/1991 | Deckard |
| 5,053,090 A | 10/1991 | Beaman et al. |
| 5,059,266 A | 10/1991 | Yamane et al. |
| 5,076,869 A | 12/1991 | Bourell et al. |
| 5,127,037 A | 6/1992 | Bynum |
| 5,132,143 A | 7/1992 | Deckard |
| 5,147,587 A | 9/1992 | Marcus et al. |
| 5,155,324 A | 10/1992 | Deckard et al. |
| 5,156,697 A | 10/1992 | Bourell et al. |
| 5,182,170 A | 1/1993 | Marcus et al. |
| 5,193,722 A * | 3/1993 | Groya .................. B65D 47/046 |
| | | 220/832 |
| 5,204,055 A | 4/1993 | Sachs et al. |
| 5,221,539 A | 6/1993 | Pallerberg et al. |
| 5,248,456 A | 9/1993 | Evans et al. |
| 5,252,264 A | 10/1993 | Forderhase et al. |
| 5,284,695 A | 2/1994 | Barlow et al. |
| 5,296,062 A | 3/1994 | Bourell et al. |
| 5,316,580 A | 5/1994 | Deckard |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,431,967 A | 7/1995 | Manthiram et al. |
| 5,433,520 A | 7/1995 | Adams |
| 5,482,659 A | 1/1996 | Sauerhoefer |
| 5,490,962 A | 2/1996 | Cima et al. |
| 5,506,607 A | 4/1996 | Sanders, Jr. et al. |
| 5,518,680 A | 5/1996 | Cima et al. |
| 5,597,589 A | 1/1997 | Deckard |
| 5,601,868 A | 2/1997 | Gerhardt |
| 5,616,294 A | 4/1997 | Deckard |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,730,925 A | 3/1998 | Wilkening et al. |
| 5,753,274 A | 5/1998 | Wilkening et al. |
| 5,807,437 A | 9/1998 | Sachs et al. |
| 5,851,465 A | 12/1998 | Bredt |
| 5,902,441 A | 5/1999 | Bredt et al. |
| 5,902,537 A | 5/1999 | Almquist et al. |
| 5,934,343 A | 8/1999 | Gaylo et al. |
| 5,943,235 A | 8/1999 | Earl et al. |
| 5,965,170 A | 10/1999 | Matsuoka et al. |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,094,994 A | 8/2000 | Satake et al. |
| 6,116,517 A | 9/2000 | Heinz et al. |
| 6,146,567 A | 11/2000 | Sachs et al. |
| 6,147,138 A | 11/2000 | Hochsmann et al. |
| 6,155,331 A | 12/2000 | Langer et al. |
| 6,165,406 A | 12/2000 | Jang et al. |
| 6,193,922 B1 | 2/2001 | Ederer |
| 6,217,816 B1 | 4/2001 | Tang |
| 6,258,170 B1 | 7/2001 | Somekh et al. |
| 6,305,769 B1 | 10/2001 | Thayer et al. |
| 6,316,060 B1 | 11/2001 | Elvidge et al. |
| 6,322,728 B1 | 11/2001 | Brodkin et al. |
| 6,375,874 B1 | 4/2002 | Russell et al. |
| 6,401,001 B1 | 6/2002 | Jang et al. |
| 6,403,002 B1 | 6/2002 | van der Geest |
| 6,416,850 B1 | 7/2002 | Bredt et al. |
| 6,423,255 B1 | 7/2002 | Hoechsmann et al. |
| 6,436,334 B1 | 8/2002 | Hattori et al. |
| 6,460,979 B1 | 10/2002 | Heinzl et al. |
| 6,467,525 B2 | 10/2002 | Herreid et al. |
| 6,500,378 B1 | 12/2002 | Smith |
| 6,554,600 B1 | 4/2003 | Hofmann et al. |
| 6,610,429 B2 | 8/2003 | Bredt et al. |
| 6,733,528 B2 | 5/2004 | Abe et al. |
| 6,764,636 B1 | 7/2004 | Allanic et al. |
| 6,818,062 B2 | 11/2004 | Tomaru et al. |
| 6,830,643 B1 | 12/2004 | Hayes |
| 6,838,035 B1 | 1/2005 | Ederer et al. |
| 7,004,222 B2 | 2/2006 | Ederer et al. |
| 7,204,684 B2 | 4/2007 | Ederer et al. |
| 2001/0050031 A1 | 12/2001 | Bredt et al. |
| 2002/0015783 A1 * | 2/2002 | Harvey .................. E01C 23/098 |
| | | 427/136 |
| 2002/0026982 A1 | 3/2002 | Bredt et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0038009 A1 | 2/2004 | Noel et al. |
| 2004/0056378 A1 | 3/2004 | Bredt et al. |
| 2004/0094058 A1 | 5/2004 | Kasperchik et al. |
| 2004/0170765 A1 | 9/2004 | Ederer et al. |
| 2005/0017394 A1 | 1/2005 | Hochsmann et al. |
| 2005/0093194 A1 | 5/2005 | Christopher et al. |
| 2006/0105102 A1 | 5/2006 | Hochsmann et al. |
| 2006/0175346 A1 | 8/2006 | Ederer et al. |

FOREIGN PATENT DOCUMENTS

| | | |
|---|---|---|
| DE | 29506204.5 | 4/1995 |
| DE | 4400523 | 7/1995 |
| DE | 4440397 | 9/1995 |
| DE | 29701279 | 1/1997 |
| DE | 19545167 A1 | 6/1997 |
| DE | 19511772 C2 | 9/1997 |
| DE | 19723892 | 9/1998 |
| DE | 19846478 | 4/2000 |
| DE | 19853834 | 5/2000 |
| DE | 10047614 | 4/2002 |
| DE | 10117875 | 1/2003 |
| DE | 10216013 A1 | 10/2003 |
| DE | 69634921 T2 | 12/2005 |
| DE | 10216013 A1 | 10/2013 |
| EP | 0711213 B1 | 5/1995 |
| EP | 0361847 | 11/1995 |
| EP | 0431924 | 1/1996 |
| EP | 0739666 | 10/1996 |
| EP | 0688262 | 6/1999 |
| EP | 0734842 | 8/1999 |
| EP | 1163999 A2 | 5/2001 |
| EP | 0968776 | 10/2002 |
| EP | 1415792 | 5/2004 |
| EP | 1442870 | 8/2004 |
| FR | 2790418 | 9/2000 |
| GB | 2382798 | 11/2003 |
| WO | WO 95/18715 | 7/1995 |
| WO | WO 96/05038 | 2/1996 |
| WO | WO 00/03324 | 1/2000 |
| WO | WO 00/21736 | 4/2000 |
| WO | 00/51809 | 9/2000 |
| WO | WO 01/26885 | 4/2001 |
| WO | WO 01/72502 A1 | 4/2001 |

(56) References Cited

FOREIGN PATENT DOCUMENTS

| | | |
|---|---|---|
| WO | WO 01/34371 | 5/2001 |
| WO | WO 02/26419 | 4/2002 |
| WO | WO 02/26420 | 4/2002 |
| WO | WO 02/26478 | 4/2002 |
| WO | WO 02/28568 | 4/2002 |
| WO | WO 02/064353 | 8/2002 |
| WO | WO 02/064354 | 8/2002 |
| WO | 02/083323 | 10/2002 |
| WO | 02/083323 A2 | 10/2002 |
| WO | WO 02/083323 | 10/2002 |
| WO | 03/016067 A2 | 2/2003 |
| WO | WO 03/016030 | 2/2003 |
| WO | WO 03/086726 | 10/2003 |
| WO | WO 03/097518 | 11/2003 |
| WO | WO 03/103932 A1 | 12/2003 |
| WO | 2004/010907 A1 | 2/2004 |
| WO | WO 2004/112988 | 12/2004 |
| WO | 2005/082603 A1 | 9/2005 |
| WO | WO 2005/080010 | 9/2005 |
| WO | WO 2005/113219 | 12/2005 |

OTHER PUBLICATIONS

Marcus, et al., Solid Freeform Fabrication Proceedings, Sep. 1995, p. 130-133.
Cima et al., "Computer-derived Microstructures by 3D Printing: Bio- and Structural Materials," SFF Symposium, Austin, TX, 1994.
Copending National Phase Application, WO 02/26419, Apr. 4, 2002.
Copending National Phase Application, WO 02/26420, Apr. 4, 2002.
Copending National Phase Application, WO 02/26478, Apr. 4, 2002.
Copending National Phase Application, WO 02/28568, Apr. 11, 2002.
Copending National Phase Application, WO 02/083323, Oct. 24, 2002.
Copending National Phase Application, WO 03/086726, Oct. 17, 2005.
Copending National Phase Application, WO 03/103932, Dec. 18, 2003.
Copending National Phase Application, WO 03/097518, Jun. 24, 2005.
Copending National Phase Application, WO 04/112988, Dec. 8, 2005.
Copending National Phase Application, WO 05/113219, Dec. 1, 2005.
EOS Operating Manual for Laser Sintering Machine with Brief Summary.
Gephart, Rapid Prototyping, pp. 118-119, 1996.
International Search Report, PCT/DE00/03324, Jun. 5, 2001.
International Search Report, PCT/DE01/03661, Feb. 28, 2002.
International Search Report, PCT/DE01/03662, Mar. 1, 2002.
International Search Report, PCT/DE02/01103, Sep. 30, 2002.
International Search Report, WO 04/110719, Jan. 11, 2005.
Marcus et al., Solid Freedom Fabrication Proceedings, Nov. 1993.
Opposition of Patent No. DE10047614, Jun. 25, 2003
Opposition to European Patent No. 1322458 B1, Jan. 19, 2005.
Sachs et al., "Three-Dimensional Printing: Rapid Tooling and Prototypes Directly from a CAD Model", Massachusetts Institute of Technology, pp. 143-151.
Sachs et al., "Three-Dimensional Printing: Rapid Tooling and Prototypes Directly from a CAD Model", Massachusetts Institute of Technology, pp. 131-136.
Williams, "Feasibility Study of Investment Casting Pattern Design by Means of Three Dimensional Printing", Department of Machanical Enginerring, pp. 2-15, Jun. 5, 1989.
Jacobs et al., 2005 SME Technical Paper, title Are QuickCast Patterns Suitable for Limited Production, 2005.
Feature Article—Rapid Tooling—Cast Resin and Sprayed Metal Tooling by Joel Segal, Apr. 2000.

\* cited by examiner

METHOD FOR APPLYING PARTICLE MATERIAL INCLUDING A METERING SYSTEM AND LEVELING ELEMENT

CLAIM OF PRIORITY

The present application is a divisional application of application Ser. No. 10/597,982, filed Aug. 15, 2006 (371 date of Apr. 26, 2007), which claims the benefit of the priority of Application No. PCT/DE2005/000237 (Published as WO/2005/080010), filed on Feb. 11, 2005, and Germany 10 2004 008 168.9 with a filing date of Feb. 19, 2004, all of which are incorporated herein by reference for all purposes.

This invention refers to a process and a device for applying fluids, especially particle material, on an area to be coated in accordance with the preamble of claims 1 and 6. Furthermore the invention also concerns the application of a device and a process like this.

The PCT publication script WO 95/18715 states to use a coater for the particle material, designed in form of a downward opening funnel, in a process for manufacturing three-dimensional objects out of particle material, such as a rapid prototyping process. This funnel vibrates during the coating process at right angles to the coater's direction of movement and parallel to the coating level. With a coater, as described in this document, an unimpeded emission of the particle material during coating can be guaranteed and densification can be achieved.

But this type of coating has a disadvantage. The particle emission cannot be switched, which means that when the vibration mechanism is deactivated, powder escapes the coater, unless this is closed from below.

It is also known from DE 102 16 013 A1 that in the case of a process to manufacture three-dimensional objects from particle material for the application of particle material, one container opened from the base, connected with a vibrating levelling element is used.

A significant advantage of this device is that the powder emission is controlled. The width of the gap is set so chat when the coater is inactive, the powder is prevented from emission due to the particle bridges formed over the gap and the particle material only leaves the gap when the coater oscillates.

For very fine or/and very free flowing (fluid) powder materials, for example fluids with a particle size <150 µm or powder, which mostly consists of round particles, this coating proves itself to be very complex because the gap has to be chosen very fine in order to achieve a spread of the particle material when the coater is inactive, because such materials are less likely to form particle bridges.

This requires an accurate alignment of the gap width to achieve the effect of the named invention. Moreover a constant gap width is necessary over the entire width of a coater. This requires a very precise alignment. For production reasons this is either barely possible or very costly.

This invention is challenged with providing a process, a device as well as a use of the device with which a controlled metering and application of any and therefore also fine and/or free flowing powder is possible.

According to the invention this challenge is solved with a process to apply fluids, especially particle material, on an area to be coated, this being viewed in a forward moving direction of the coater, that fluid is applied on the area to be coated and then a levelling element is run over the applied fluid, whereby the fluid is led from a metering system provided with an opening, which at least performs an oscillation during application of the fluid. The opening is closed when the metering system is at a standstill by the fluid forming an angle of repose in the opening.

The metering system features an oscillating container provided with an opening, in which the opening is designed in such a way that no material flows out when the metering system is inactive as an angle of repose is formed in the opening and when the vibration mechanism is activated the angle of repose breaks downs and the particle material is emitted.

The levelling element can be designed as a blade, which is either run only fixed over the fluid or also oscillates, if necessary, with the metering system.

Under the forward motion of the blade the direction of the coater shall be recognised in the coating stage. If coating is possible in two or more directions of the coater, the forward motion can also be possible in several directions.

As a levelling element a roller with an axle parallel to the surface area to be coated and vertical to the coating direction is also suited. The roller car be fixed, or rotate around its own axle. The direction of rotation is set in the opposite direction to the forward motion direction of the coater, in order to emit the fluid from the gap between roller and powder bed surface.

Figure 2:
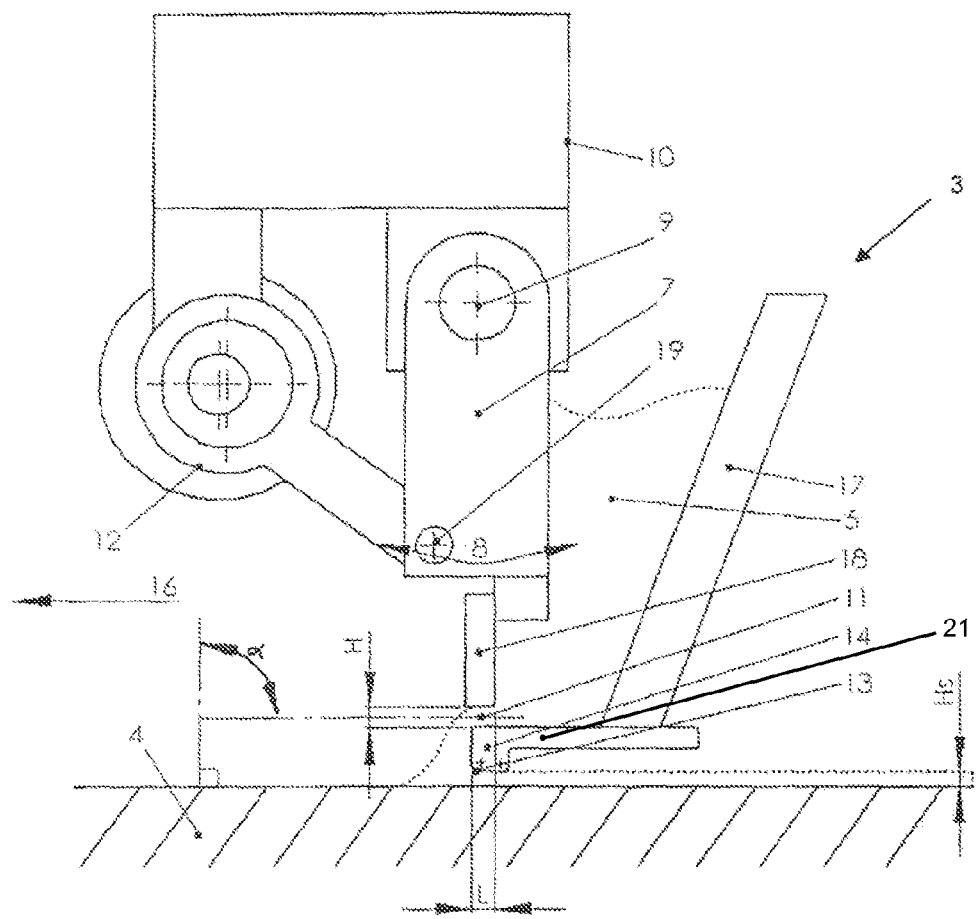

The fluid is coated according to this invention from a metering system provided with an opening, whereby the opening, described in the illustration, is designed in a vertical direction to the area to be coated seen with an angle α. In colloquial speech it is a type of "side" opening. No vertical application is made on the area to be coated (for example, by the employing a metering system including a container having a bottom wall, such as illustrated in FIG. 2).

The opening is blocked from particle material when the container is inactive due to the formation of an angle of repose in the opening. It no longer flows uncontrolled, as in processes of prior art, when the coater is at a standstill. Instead it is retained by the design of the opening according to the invention when the coater is at a standstill.

The opening can have any width adapted to the process. If a component essentially spans across the entire width of the area to be coated, the coater and the opening also span over their entire width favourably. One and/or several smaller openings would also be possible.

The oscillation of the metering system can be horizontal or/and vertical according to this invention. Especially good results could be achieved if the oscillation contains vertical as well as horizontal components. In particular an oscillation proved itself to be beneficial according to the type of rotation.

Especially good coating results could be achieved with a process in line with the invention, if the levelling element also oscillates when the applied fluid runs over.

In the case of an especially preferred the embodiment of this invention the levelling element resonates with the metering system.

In such an embodiment of this invention the densification of the fluid can be achieved by two effects.

By means of the oscillation or vibrations of the container and the fluid, the particles of the material to be coated are graded to a higher packing density. In addition if the levelling element oscillates horizontally and/or vertically, a densification of the fluid under the levelling element is also achieved through movement.

However, it must be observed that too strong a densification of the particle material achieved this way can lead to movement in the powder bed over the actual layer and thus lead to a deterioration of the structure printed.

According to this invention, the particle material is compacted by the oscillation prior to coating in the metering system, so before laying the coat, the densification can be carried out gently by the levelling element. Damage to the area to be coated is therefore avoided.

The densification of the powder bed is essentially homogenous over the area to coated and not dependent on the direction of the coater, as this is the case in the process of the prior art. It is possible therefore to achieve an adequately good coating result in one coat. This leads to a time saving compared to the process of prior art, with which an adequately homogenous coating result only can be achieved typically after a second coat.

If it requires further definition of the rapid prototyping equipment, the coater and as the case may be, the metering system can be led back over the powder bed into the starting position after running over the area to be coated once, at increased speed and without oscillation and therefore without particle emission. The coating result achieved previously is thus not affected.

According to a favoured embodiment of this patent a metering quantity of fluid required for the coating should always be smaller than residual volume of the fluid present in the container.

By means of oscillation of the metering system, and the container if the case may be, the fluid can be metered on the area to be coated. When activating the oscillation mechanism of the container the fluid, and if the case may be the particle material, is fluidised in the container and flows out of the opening of the metering system in front of the levelling element. If the oscillation mechanism stops, when an angle or repose is formed in the opening the particle material remains in the container.

The rotary motion of the coater's oscillation, the metering system and/or the levelling element is preferably achieved over the eccentric for the process in line with the invention, which are attached torque proof to the drive motor shaft.

The transmission of power from the eccentric to the coater, the metering system or/and the levelling element can be for example, form-fit, therefore illustrated be directly applying a ball bearing on the eccentric.

This process in line with the invention can be carried out preferably with a device to apply fluids on an area to be coated, whereby a levelling element and a metering device viewed in forward direction of the levelling element is provided, via the fluid to be applied on the area to be coated. The blade can be run over the fluid applied, whereby the metering device is provided with an opening and an oscillation can be performed. The opening is designed in line with this device, in such a way that when the metering system is at a standstill it is closed by means of the fluid forming an angle of repose.

In accordance with the preferred embodiment the device is designed in such a way that the metering system, and the container respectively is connected to the levelling element.

With such a preferred embodiment of the invention it is possible to place the emission of particle material as close as possible on the levelling element. Furthermore it is also possible that the oscillation mechanism as well as the metering system also drives the levelling element.

In line with an especially preferred embodiment the container of the metering system is essentially designed as a funnel.

In activating the oscillation mechanism of the container, so the funnel here, the particle material fluidises in the funnel and flows out of the side opening, which can be designed as a gap, in front of the levelling element.

In another case the particle material stays in the container, if the gap (length and height) is set accordingly, so that due to the formation of an angle of repose in the opening other material is prevented from emission. The funnel can therefore convey a significantly larger quantity of material than is necessary for the actual coat.

On the one hand the result is a significantly lower quantity of waste material. On the other hand the requirements of the feed system, which meters the particle material into the funnel, are reduced. An equal distribution of quantity in the container over the coater width or the width of the opening has to be ensured.

A possible over-filling or if the supply is lowered too heavily into the funnel could be monitored preferably with a fill level sensor and if necessary, it would be possible to top up the funnel from the feed system. This is possible after one coat.

The coating unit shall be designed as rigid as possible in order to be able to transfer the oscillations exactly.

The container opening, preferably a cap, shall be dimensioned in height and length so that when the coater is inactive no particle material flows out of the container or funnel and when the vibration mechanism is activated just as much material is emitted as is necessary for coating. The emission quantity is preferably regulated via the cap height and oscillation amplitude of the metering system.

It has thus emerged that a longer gap has to be chosen higher, in order to achieve the same material emission as a shorter gap. In order to achieve an equal emission over the entire coating width, it is useful to choose a long and high gap. In this way the metering system is easier to set, more tolerant compared to variations in the gap dimension and more unsusceptible to blockage of the gap.

If the gap is set too large, particle material is accrued in front of the blade during operation of the coater. In order to obtain a good coating result the quantity in front of the levelling element should remain constant during the entire coating process.

In a preferred embodiment this is therefore achieved so that the gap is fixed as close as possible over the surface area to be coated directly with the levelling element. The gap can be dimensioned in a way that when the vibration mechanism is activated relatively a great deal of particle material is emitted. In the coating the particle material is accrued until it reaches the metering opening. Through the accrued particle material now further material is prevented from escaping the supply through the opening. In this way a constant quantity of powder can be achieved in front of the levelling element without adjustment works on the gap height.

A self-regulating system like this has a significant advantage compared to well-known coating process, as no exact alignment of the opening is necessary. This is very complex particularly with very wide openings.

The levelling element smoothes and condenses the applied material. A changeable blade is preferably chosen with a specific support length. Via the incline of the support area to the coating surface area the densification of the layer can set well.

The blade has rounded edges in accordance with a preferred embodiment. This prevents damage to the applied coating surface area. The round forms preferably have a radius of 0.2 to 1 mm.

The coater, which at least consists of a metering system and the levelling element, is activated to oscillate. One advantage is that the oscillation occurs mainly in the coating direction. However it is also possible to let the system oscillate with an additional vertical component, in order to achieve a higher densification of the particle material. But is must be observed that too strong a densification of the particle material can lead to a movement in the powder bed over the actual layer and thus lead to a deterioration of the structure printed.

Via frequency and amplitudes (horizontal) and vertical of the oscillator, on the one hand the densification and on the other hand the emission quantity of the metering system can be set.

As already discussed the coating equipment in line with the invention is especially suited for the use of very fine particle materials (particle sizes <150 μm), as they are used in the current rapid prototyping processes, like 3D printing or selective laser sintering established for example from the EP 0 431 924. In these processes the grain size of the particle material determines the possible layer thickness and therefore the accuracy and resolution of the printed parts.

Unlike the processes of prior art particle materials with rounded grain sizes and therefore high flow capability as well as powder with square-edged particles and lower flow capability can be processed. By means of fluidisation of the particle material in the metering system the outcome in both cases is a homogenous coating result.

With the process according to the invention plastic particle materials such as PMMA, PA or PS, the most diverse forms of metal powder as well as form sands such as silica sand, zircon sand, magnetite or chromerz sand can be processed. The selection of material grade depends solely on the selected layer build method and the properties of the target material grade.

The particle materials can be homogenous or as particle mix or coated powder. It is also possible that other substances in the form of fluids are added to the particle material before the coating process.

Other powder mixes contain for example fibre materials for later strengthening of the component.

Other beneficial embodiments of this invention result from the sub claims as well as the description.

For a more detailed illustrated the invention is described in more detail below based on favoured design examples with reference to the diagram.

The diagram shows:

FIG. 1 the sequence of a process in line with the invention according to a preferred embodiment; and FIG. 2 the device as per the invention in accordance with a preferred embodiment.

For example, below the process and the device according to the invention for use in layer design of cast models from particle material and binding agent in rapid prototyping process are explained.

In particular it can be assumed from very fine and flow-capable particle materials that a rapid prototyping process is used.

Referring to FIG. 1 the sequence of the coating is described below according to the preferred embodiment of the process in line with the invention.

In a set up process of a component, such as for example a cast model, a construction platform 4 on which the model is to be built, is lowered around a layer strength of the particle material 5. Then the particle material 5, for example very fine plastic powder is applied to the construction platform 4. This has a required layer strength from the container, here a funnel 3. Then the selective application of binding agent is attached to the hardened areas. This can be carried out using a drop-on-demand-drop generator, depending on the type of ink-jet printer. These application steps are repeated, until the finished component, embedded into the loose particle material 5, is obtained.

At the start coater 1 is in the starting position, which is represented in FIG. 1a. It is first filled via a filling device, if the fill level sensor has recognised a sub level in a container, which is designed here as a funnel 3.

As illustrated in FIG. 1b, the construction platform 4 is lowered to more than one layer.

Then the coater 1, as shown in FIG. 1c, without oscillation movement and thus without feed effect in the position compared to the filling device 2, until it is over the edge of the construction platform 4.

Now the build platform 4 is raised exactly to the layer height, as FIG. 1d shows. This means that the build platform 4 is now accurately lowered to the layer height.

Now the coater 1 begins to oscillate and goes in a constant run over the build platform 4. Thus it emits particle material 5 in exactly the right quantity and coats the build platform 4. This is shown in FIG. 1e.

The running speed of the coating is between 10 and 200 mm/s. The selectable coating speed depends on the emitted particle quantity and the movement of the individual particle. If the run speed is selected too great compared to the particle emission, imperfections surface detects; are formed in the powder bed, which can lead to delaminating of the component in the worst case. Generally for reasons of productivity higher coating speeds are beneficial.

An unfavourable conformation of run speed in oscillation movement of the levelling element leads to so-called chatter marks on the powder bed surface. These have a negative effect on the component quality. Generally, the higher the coating speed chosen, the higher the oscillation frequency on the moved levelling element.

The coater 1 runs after the coating run without oscillation movement, which means as quick as possible, back to the starting position and can be refilled as required via the filling device 2. This is shown in FIG. 1f; which corresponds to 1a.

In order to balance an unequal filling of the coater 1 via its length, after a specific time the funnel 3 can be emptied via the waster container 6 by means of oscillation of the funnel 3 and subsequently refilled.

The printing process, or illumination process to harden the particle material provided with binding agent 1 can take place during or after the coating.

FIG. 2 shows a device in line with the invention according to a favoured embodiment.

In particular also for carrying out the process according to the invention a device is suitable according to the demonstrated favoured embodiment.

In line with FIG. 2 particle material 5 is applied to an area to be coated, whereby a rocker 7, which contains a metering device 3, viewed in a forward direction 16 of the blade 14 particle material 5 on the build platform 4. Furthermore a blade 14 is provided as a levelling element, which condenses, smoothes the applied material, and ensures a constant layer thickness $H_s$ of the applied particle material 5.

The rocker 7 is applied to the coater main bracket 10 according to the preferred embodiment in such a way that it can perform an oscillation depending on the type of rotary motion indicated by arrow 8. The coater main bracket 10 spans over the entire width of the build platform 4 in accordance with the preferred embodiment. The rotary axis 9 of the rocker 7 is vertical to the running movement represented by arrow 16 in accordance with the preferred embodiment and parallel to the longitudinal axis of the rocker 7.

In this case the metering device 3 contains a container, a funnel-shaped particle device, which is formed via the rocker 7 and a corresponding sheet 17, and features a metering gap, located in the container, which means vertical to the coating direction viewed with an angle α and in running direction in front and above the stripper blade 14. In accordance with the diagram this is about 90°. This shall only serve as an example. With reference to FIG. 2, the container may have a bottom wall 21. For example, the only opening for the flow of particles from the container may be through the vertical metering gap. The bottom wall 21 preferably is parallel to the area to be coated. The bottom wall 21 may be connected to the corresponding sheet 17.

The sheet 17 and the blade 14 are arranged in such a way that the gap height H and gap length L of the opening 11 designed as a gap is measured so that when the vibration mechanism is deactivated no particle material 5 leaves the supply and when the vibration mechanism is activated more particle material 5 is emitted than is necessary for dimension of the compressed layer. The height of the gap 11 can be set by means of the locking bolt 18.

The surplus material is collected in front of the blade 14. If the surplus particle material 5 reaches the opening 11 in front of the blade 14, which is formed here as a gap, further particle material 5 is prevented from leaving the opening 11. This way in the coating run along the blade 14 an equally large accumulation of particle material 5 is set in front of the blade. This leads to a uniform coating result over the entire width of the coater and over the entire length of the section 4.

The rocker 7 with the firmly connected or contained metering unit and blade 14 oscillates according to arrow 8 around the rotary axis 9. By means of another arrangement of the rotary axis 9 a movement can be realised with an additional vertical share, in order to achieve an additional compression effect of the applied layer through an extra vertical movement of the blade 14.

The oscillation of the rocker 7 can be set by the size of the eccentric 12 and its juncture 19 with the rocker 7, so that the amplitude of movement of the blade 14 lies between 0.05 and 1 mm.

The amplitude and frequency of the oscillation are adapted so that there is a sufficient compression of the particle layer and adequate particle material 5 is supplied by the metering system. The amplitude and the oscillation direction shall be chosen so that no damage to the area below the layer occurs.

The device is designed according to the embodiment in a way that a propulsion of the coater 4 is made over at least a fast running electro motor, which brings the wave 7 to oscillation via an eccentric.

The motor used for driving the eccentric 12 has for example a nominal rotation speed at 12V of 3000 U/min, the hub of the eccentric 12 amounts to 0.15 mm, which corresponds to an amplitude on the top of the blade 14 of 0.20 mm according to the example described. At 15 V a rotational speed of 4050 U/min was measured. This value corresponds to 67.5 Hz. Depending on the width of the blade 7 it can be necessary, to provide several pivotal points.

The blade 14 features rounded edges. This prevents damage to the applied coating surface area. The round forms preferably have a radius of 0.2 to 1 mm.

What is claimed is:

1. A process for the application of a fluid on an area to be coated comprising the steps of:

metering the fluid through an opening in a container of a metering system while the metering system is moving in a forward direction;

applying the fluid on the area to be coated;

levelling the fluid applied on the area using a levelling element while metering system is moving in the forward direction, and stopping the metering system by placing it at a standstill;

wherein the metering system performs an oscillation at least when applying the fluid, wherein the opening is closed when the metering system is at a standstill by the fluid forming an angle of repose in the opening;

wherein the container has a bottom wall so that vertical flow out of the container is prevented;

wherein the opening is located above the levelling element, and wherein the opening is located on a wall of the metering system that is perpendicular to the area to be coated;

wherein the container of the metering system and the leveling element travel together in the forward direction, and the step of leveling the applied fluid occurs immediately after the step of applying the fluid wherein the method includes a step of selectively applying a binding agent over the levelled fluid.

2. The process of claim 1, wherein the oscillation includes horizontal oscillating or/and vertical oscillating or/and rotational oscillating, and the levelling element is designed as a blade, which oscillates with the metering system.

3. The process of claim 1, wherein the levelling element is designed as a rotating roller, whose rotary motion is positioned against the forward direction of the coater.

4. The process of claim 1, wherein a metering quantity of the fluid is always smaller than a residue volume of the fluid available in the metering system.

5. The process of claim 1, wherein the levelling element sets an amount of the fluid vertically to the area to be coated.

6. The process of claim 1, wherein the opening is located in a first aperture fixed in the wall, the wall is an upright wall, and the first aperture is generally perpendicular to a build platform located below the device; and wherein the container includes a second aperture at the top of the container for filling the container wherein the second aperture remains open during the steps of metering, applying, levelling, and forming an angle of repose in the opening.

7. The process of claim 6, comprising breaking down the angle of repose formed in the opening when the vibration mechanism is activated; and a step of filling the container; and wherein a generally horizontal orientation of the first aperture and a generally upward orientation of the second aperture is maintained during the steps of metering, applying, levelling and forming an angle of repose in the opening, the filling the container.

8. A process for the application of a fluid including a particle material, comprising the steps of:

a) metering the fluid through an opening in a side wall of a container of a metering system while the metering system is moving in a forward direction, wherein the opening is located on the forward side of the container;

b) oscillating the metering system while the fluid is being metered, including oscillating the container at least in the forward direction, so that the particle material fluidizes and flows out the side opening;

c) levelling the applied fluid while the metering system is moving in the forward direction and d) stopping the oscillation of the metering system so that an angle of repose of the fluid is formed in the opening and the particle material remains in the container;

wherein the container has a bottom wall, and the bottom wall is parallel to an area to be coated;

wherein the container of the metering system and the leveling element travel together in the forward direction, and the step of leveling the applied fluid occurs immediately after the step of applying the fluid wherein the method includes a step of selectively applying a binding agent over the levelled fluid.

9. The process of claim 8, wherein the oscillating step includes horizontal oscillating, vertical oscillating, rotational oscillating, or any combination thereof.

10. The process of claim 9, wherein the step of levelling is performed using a blade that oscillates with the metering system.

11. The process of claim 10, wherein the oscillating is performed by eccentric driven rocker.

12. The process of claim 9, wherein the step of levelling is performed by a rotating roller.

13. The process of claim 12, wherein the oscillating is performed by eccentric driven rocker.

14. The process of claim 8, wherein the step of levelling is performed using a blade that oscillates with the metering system.

15. The process of claim 8, wherein the step of levelling is performed by a rotating roller.

16. The process of claim 8, wherein the amount of fluid being metered is smaller than a residual amount of fluid in the metering system.

17. The process of claim 8, wherein the oscillating is performed by eccentric driven rocker.

18. The process of claim 8, wherein the metering system comprises:
    a. an oscillatable rocker having an external wall;
    b. an inclined sheet opposite the rocker forming a container between the rocker and the inclined sheet; and
    c. the levelling element located below the container and
    d. the bottom wall is connected to the inclined sheet;
    wherein the opening is formed below the oscillatable rocker so that the levelling element prevents the fluid from being vertically applied.

19. The process of claim 18, wherein the opening is located in a first aperture fixed in the side wall, the side wall is an upright wall, and the first aperture is generally perpendicular to a build platform located below the device; the process includes a step of filling the container; and wherein the container includes a second aperture at the top of the container for filling the container wherein the second aperture remains open during the steps a through d of metering, oscillating, leveling and stopping and during the step of filling the container.

20. The process of claim 19, comprising breaking down the angle of repose formed in the opening when the vibration mechanism is activated; a step of filling the container; and wherein a generally horizontal orientation of the first aperture and a generally upward orientation of the second aperture is maintained during the steps a through d of metering, oscillating, leveling and stopping and during the step of filling the container.

21. A process for building a 3-dimensional part in layers comprising the steps of:

metering a fluid through an opening in a container of a metering system while the metering system is moving in a forward direction;

applying the fluid over an area to be coated;

levelling the fluid applied on the area using a levelling element while the metering system is moving in the forward direction, and selectively applying a binding agent over the levelled fluid;

stopping the metering system by placing it at a standstill;

wherein the metering system performs an oscillation at least when applying the fluid, wherein the opening is closed when the metering system is at the standstill by the fluid forming an angle of repose in the opening;

wherein the container has a bottom wall so that vertical flow out of the container is prevented;

wherein the opening is located above the levelling element, and wherein the opening is located on a wall of the metering system that is perpendicular to the area to be coated;

wherein the container of the metering system and the leveling element travel together in the forward direction, and the step of leveling the applied fluid occurs immediately after the step of applying the fluid.

* * * * *